United States Patent [19]

Taniguchi et al.

[11] Patent Number: 4,705,099

[45] Date of Patent: Nov. 10, 1987

[54] QUICK FREEZE COOLING/HEATING UNIT POWERED BY AUTOMOTIVE AIR CONDITIONER

[75] Inventors: Fumio Taniguchi, Ebina; Tomio Matsuno, Isehara, both of Japan

[73] Assignee: Nissan Motor Co., Ltd., Yokohama, Japan

[21] Appl. No.: 726,774

[22] Filed: Apr. 24, 1985

[30] Foreign Application Priority Data

Apr. 25, 1984 [JP] Japan .............................. 59-61892[U]

[51] Int. Cl.$^4$ ...................... F28F 27/00; G05D 23/32; F25D 17/06; F25D 29/00
[52] U.S. Cl. ......................... 165/12; 165/43; 165/61; 62/158; 62/186; 62/526
[58] Field of Search ................. 62/158, 186, 524, 526; 165/12, 43, 61

[56] References Cited

U.S. PATENT DOCUMENTS

| | | | |
|---|---|---|---|
| 2,662,380 | 12/1953 | Sutton | 62/155 |
| 2,944,410 | 7/1960 | Mann et al. | 62/186 |
| 3,384,801 | 5/1968 | Rodgers | 62/186 |
| 3,747,361 | 7/1973 | Harbour | 62/186 |
| 3,950,961 | 4/1976 | Lotz | 62/526 |
| 4,002,199 | 1/1977 | Jacobs | 165/61 |
| 4,137,057 | 1/1979 | Pief et al. | 62/186 |
| 4,358,932 | 11/1982 | Helfrich, Jr. | 62/186 |
| 4,416,119 | 11/1983 | Wilson et al. | 62/186 |
| 4,483,151 | 11/1984 | Fujioka et al. | 165/43 |

OTHER PUBLICATIONS

ASHRAE Handbook, 1983 Equipment, American Society of Heating Ventilation and Air Conditioning Engineers, Atlanta, Ga, p. 20.8.

Primary Examiner—William R. Cline
Assistant Examiner—John K. Ford
Attorney, Agent, or Firm—Schwartz, Jeffery, Schwaab, Mack, Blumenthal & Evans

[57] ABSTRACT

Herein disclosed is an improved cooling/heating unit incorporated with an automative air conditioner. The unit achieves quick freezing of ice cubes by stopping operation of an electric fan for a predetermined time. The electric fan is located in a refrigerated compartment through which a portion of an evaporator, which also passes through a freezer compartment, is arranged. By suppressing the operation of the fan, the total heat transfer capacity of the system can be directed toward increasing the cooling capacity in the freezer compartment.

3 Claims, 6 Drawing Figures

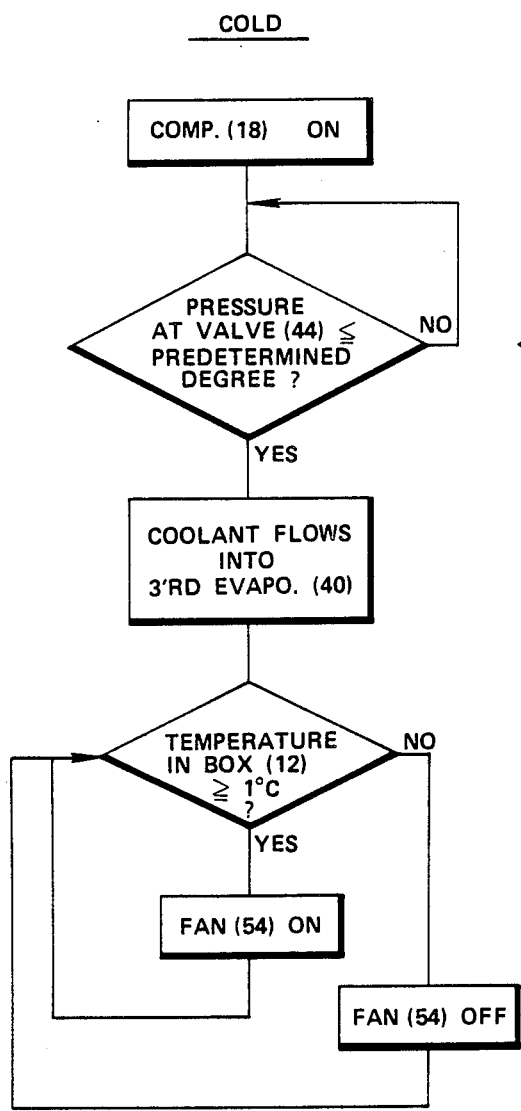
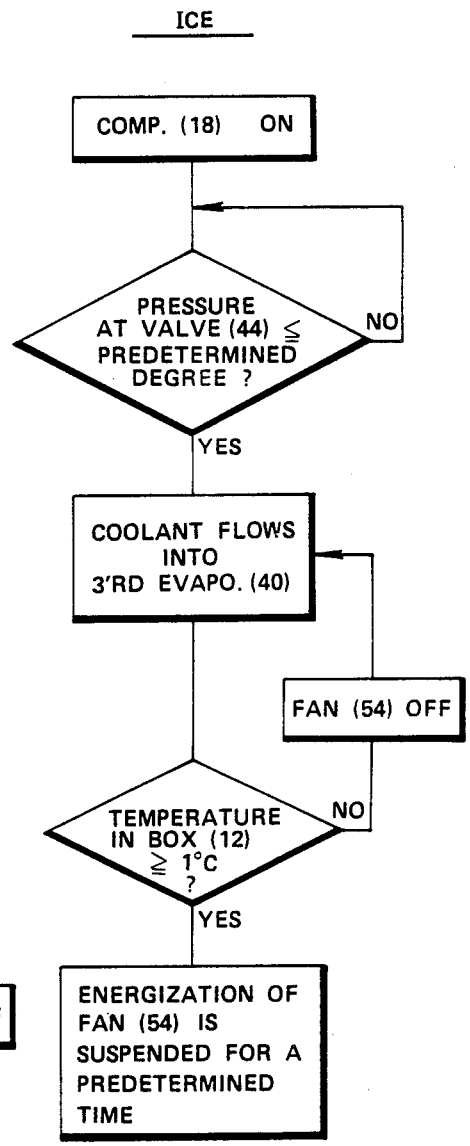

4,705,099

QUICK FREEZE COOLING/HEATING UNIT POWERED BY AUTOMOTIVE AIR CONDITIONER

BACKGROUND OF THE INVENTION

The present invention relates to a cooling/heating unit for cooling and/or heating contents thereof, and more particularly to a cooling/heating unit mounted on a motor vehicle and powered by an automotive air conditioning system.

SUMMARY OF THE INVENTION

According to the present invention, there is provided an improved cooling/heating unit which achieves a so-called "quick freezing" of ice cubes when desired.

According to the invention, there is provided a cooling/heating unit powered by an automotive air conditioning system, the cooling/heating unit comprising a container for containing therein goods which are to be cooled or heated, an evaporator arranged in the container and fluidly connected to the air conditioning system so as to allow coolant to flow in the evaporator, an electric fan for producing air flow in the container when electrically energized, a temperature sensor for sensing a temperature in the container, first means for energizing the electric fan when the temperature sensor senses that the temperature in the container is higher than a predetermined degree, second means for suspending energization of the electric fan for a predetermined time even when the temperature in the container is higher than the predetermined degree, and third means for selectively operating the first and second means.

BRIEF DESCRIPTION OF THE DRAWINGS

Other objects and advantages of the present invention will become apparent from the following description when taken in conjunction with the accompanying drawings, in which:

FIG. 5 is a flowchart representing a control carried out in a cooling (COLD) mode of the cooling/heating unit of the present invention; and FIG. 6 is a flowchart representing a control carried out in a freezing (ICE) mode of the cooling/heating unit of the present invention.

DESCRIPTION OF A PRIOR ART COOLING/HEATING DEVICE

Prior to describing in detail the cooling/heating unit of the present invention, a conventional cooling/heating unit will be described with reference to FIGS. 1 and 2 in order to clarify the invention.

Figure 1:
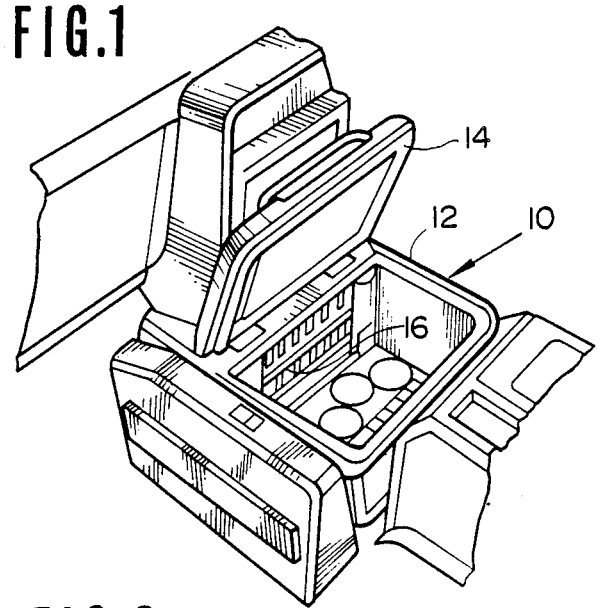
FIG. 1 is a perspective view of a container part of a cooling/heating unit, which is installed in a passenger cabin of a motor vehicle.

Referring to FIG. 1, there is shown a container part 10 of a cooling/heating unit, which is installed in a passenger cabin of a motor vehicle and incorporated with an automotive air conditioner as will be described hereinafter. The container part 10 shown in the drawing comprises generally a cooling/heating box 12 placed on a floor of the passenger cabin and a lid 14 hinged to the box 12. Within the box 12, there are arranged ice trays 16 for the freezing of ice cubes.

Figure 2:
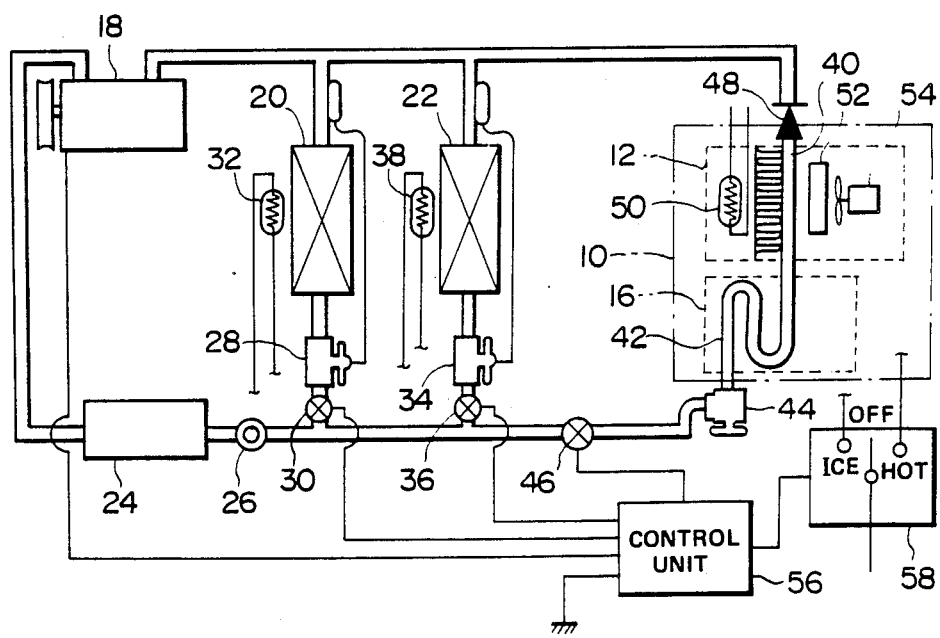
FIG. 2 is a diagram of an operating system of a prior art cooling/heating unit.

Referring to FIG. 2, there is shown the operating system of a prior art cooling/heating unit, which controls the temperature in the box 12. The system is incorporated with an automotive air conditioning (or cooling) system which comprises generally a compressor 18 driven by an engine (not shown) of the vehicle, a first evaporator 20, a second evaporator 22, a condenser 24 and a liquid tank 26 which are connected together through pipes (no numerals) to constitute two groups (first and second groups) of refrigeration cycles, the first being composed of the compressor 18, the condenser 24, the liquid tank 26 and the evaporator 20, and the second being composed of the compressor 18, the condenser 24, the liquid tank 26 and the evaporator 22. The first and second groups are used for cooling the front and rear portions of the passenger cabin respectively. The respective conduits connected to the first and second evaporators 20 and 22 are each provided with an expansion valve 28 or 34 and an electromagnetic valve 30 or 36. Designated by numerals 32 and 38 are temperature sensors of the thermistor type, which are arranged to sense the temperatures of air cooled by the respective evaporators 20 and 22.

The operating system of the cooling/heating unit comprises a third group of refrigeration cycle which is applied to the container part 10 to allow the same to function as a cooling box. The third group cycle is composed of the compressor 18, the condenser 24, the liquid tank 26 and a third evaporator 40 which is arranged in the container part 10. A part 42 of the evaporator 40 is attached to the ice trays 16. The conduit connected to the evaporator 40 is provided with a constant pressure expansion valve 44, an electromagnetic valve 46 and a check valve 48 which are connected in series, as shown. A temperature sensor 50 of the thermistor type is arranged to sense the temperature of air cooled by the evaporator 40. Designated by numerals 52 and 54 are an electric heater and an electric fan which are arranged to warm or heat the air in the box 12 evenly.

A control unit 56 is arranged to electrically control the operation of the cooling/heating unit. That is, "ON-OFF" control of the compressor 18 and "OPEN-CLOSE" control of the electromagnetic valves 30 and 36 are carried out in accordance with information signals issued from the temperature sensors 32 and 38, so that a suitable amount of coolant flows in the evaporators 20 and 22 for cooling the passenger cabin to a desired degree. The electromagnetic valve 46 is also controlled by the control unit 56 to allow a suitable amount of coolant to flow in the third evaporator 40 thereby cooling the interior of the box 12 and/or freezing ice cubes in the ice trays 16. The third evaporator 40 opens only when the intake pressure of the compressor 18 becomes lower than a predetermined degree. During cooling in the box 12, the electric fan 54 is kept energized to achieve even cooling in the box 12. However, when the temperature sensor 50 senses that the temperature in the box 12 becomes lower than a predetermined degree, energization of the electric fan 54 stops. With this, undesired freezing of goods in the box 12 is prevented.

Designated by numeral 58 is a switch circuit by which the cooling and heating modes in the box 12 are changeable with the aid of the control unit 56. That is, when the heating mode is selected by the switch circuit 58, the electric heater 52 and the electric fan 54 are energized to heat or warm the interior of the box 12. Thus, in this case, the box 12 serves as a heating box.

However, in the prior art cooling/heating unit as mentioned hereinabove, a so-called "quick freezing of ice cubes" is not achieved because of the inherent arrangement of the employed electric circuit. That is, under the cooling mode, the electric fan 54 continues to run until the temperature (which is sensed by the temperature sensor 50) in the box 12 falls to a predetermined level. During the time for which the fan runs, considerable heat exchange is carried out between the coolant in the evaporator 40 and any goods in the box 12 thereby increasing the pressure of the coolant in the evaporator 40 and thus deteriorating cooling efficiency of the same. Thus, quick freezing is not achieved in the conventional unit.

DETAILED DESCRIPTION OF THE PREFERRED EMBODIMENTS

Figure 3:
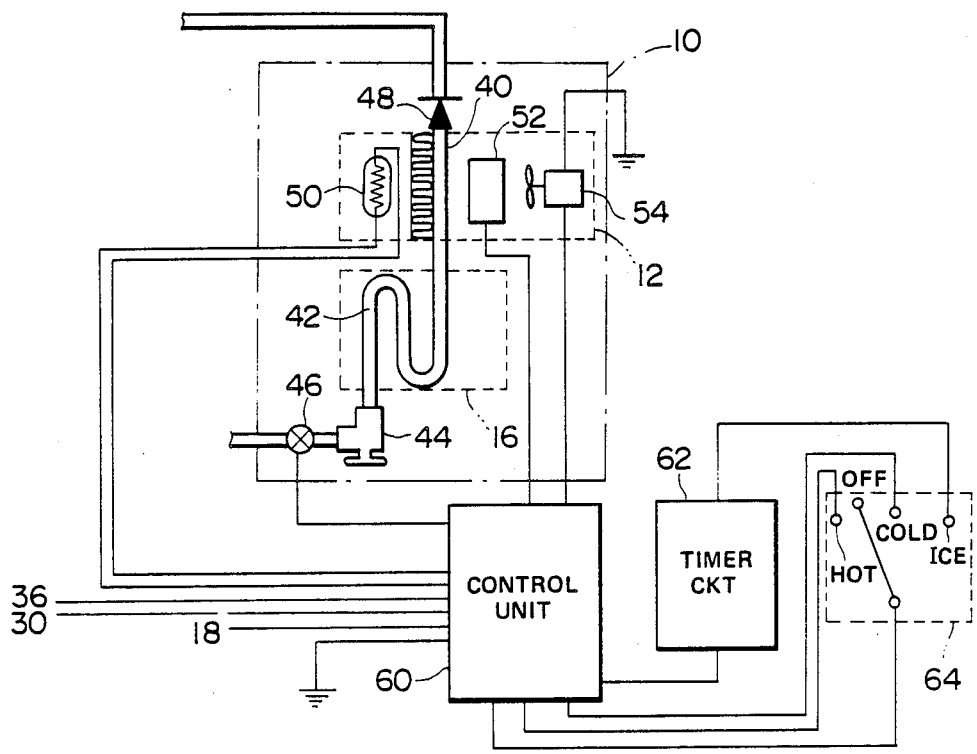
FIG. 3 is a diagram of an operating system of an improved cooling/heating unit according to the present invention.
Figure 4:
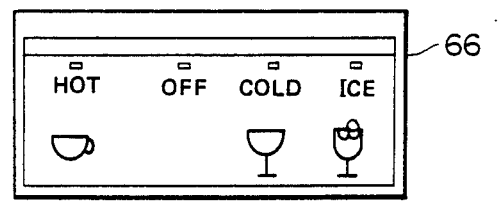
FIG. 4 is a front view of a pictorial panel for use with the cooling/heating unit of the invention.

Referring to FIGS. 3 and 4, particularly FIG. 3, there is shown but partially an operating system of the improved cooling/heating unit according to the present invention. The parts employed in the invention are substantially the same as those of the above-mentioned conventional system except for an electric circuit which includes a control unit 60, a timer circuit 62 and a switch circuit 64. Thus, the same parts are designated by the same numerals as in the conventional system. The switch circuit 64 is arranged to create in the box 12 heating (HOT), cooling (COLD) and freezing (ICE) modes, selectively. The switch circuit 64 is equipped with a pictorial panel 66 as shown in FIG. 4.

When the switch circuit 64 selects the cooling (COLD) mode, the control unit 60 controls the "ON-OFF" operation of the electromagnetic valve 46 to allow a suitable amount of coolant to flow in the third evaporator 40 thereby cooling the interior of the box 12 and/or freezing ice cubes in the ice trays 16, and at the same time, the control unit 60 controls the electric fan 54 in such a manner that when the temperature (which is sensed by the temperature sensor 50) in the box 12 becomes lower than a predetermined degree, for example, 1° C., energization of the electric fan 54 stops to prevent undesired freezing of goods in the box 12. This operation will be understood from the flowchart of FIG. 5. When the switch circuit 64 selects the freezing (ICE) mode for the purpose of quickly making ice cubes in the ice trays 16, the control unit 60 controls the electric fan 54, with an aid of the timer circuit 62, in such a manner that the energization of the electric fan 54 stops for a predetermined time even when the temperature in the box 12 is higher than the predetermined degree (1° C.). This operation will be understood from the flowchart of FIG. 6. When the switch circuit 64 selects the heating (HOT) mode, the control unit 60 closes the electromagnetic valve 46 to suspend operation of the third evaporator 40 and energizes both the electric heater 52 and the electric fan 54 to heat or warm the interior of the box 12 evenly.

As is understood from the above, when the switch circuit 64 selects the freezing (ICE) mode for the purpose of quickly making ice cubes, the electric fan 54 stops its operation for a time determined by the timer circuit 62 even when the temperature in the box 12 is higher than the predetermined degree (1° C.). With this, "quick freezing of ice cubes" is achieved because of absence of the considerable heat exchange between the coolant in the evaporator 40 and the goods in the box 12.

What is claimed is:

1. A cooling/heating unit powered by an automotive air conditioning system, said unit comprising:
   a container having first and second compartments for containing therein goods which are to be cooled or heated;
   an evaporator arranged in said container and operatively connected to said air conditioning system so as to allow the coolant of said system to flow in said evaporator;
   an electric fan for producing air flow in said first compartment when electrically energized;
   a temperature sensor for sensing a temperature in said first compartment;
   first means for energizing said electric fan when the temperature sensor senses that the temperature in said first compartment is higher than a predetermined degree;
   second means for suspending energization of said electric fan for a predetermined time, even when said temperature sensor senses the higher temperature in said first compartment, to thereby initiate quick freezing of goods in said second compartment;
   third means for selectively operating said first and second means; and
   an electric heater arranged in said container for heating the interior of said first compartment when said first and second means are both in their inoperative conditions.

2. A cooling/heating unit as claimed in claim 1, further comprising:
   an electromagnetic valve connected to an upstream portion of said evaporator with respect to the direction in which the coolant flows;
   a constant pressure expansion valve interposed between said electromagnetic valve and said evaporator; and
   a check valve connected to a downstream portion of said evaporator.

3. A cooling/heating unit as claimed in claim 1, in which said predetermined degree of temperature is approximately 1° C.

* * * * *